Figure 1:
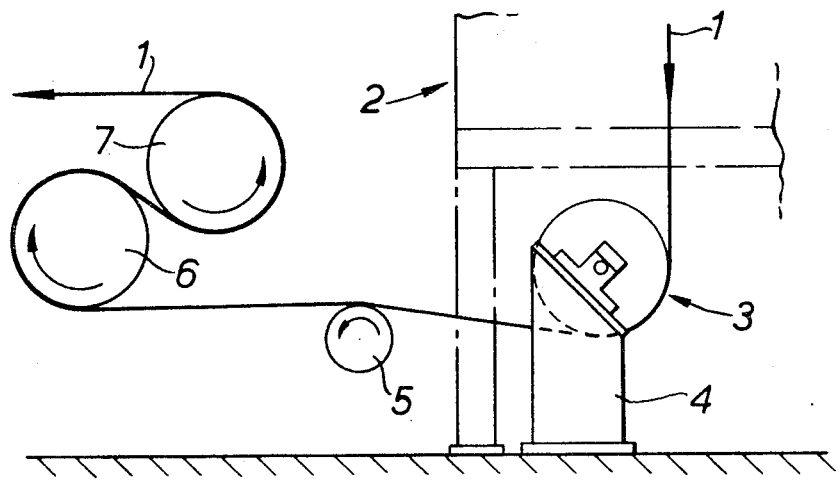

United States Patent [19]
Lapper

[11] 3,748,575

[45] July 24, 1973

[54] APPARATUS FOR TESTING MAGNETIC CHARACTERISTICS OF A MOVING METAL STRIP UTILIZING A ROLLER CONTAINING A FIXED NONROTATABLE MONITOR IN CONTACT WITH THE STRIP

[75] Inventor: Maurice Noel Lapper, Llanelli, Carmarthen, Wales

[73] Assignee: British Steel Corporation, London, England

[22] Filed: June 18, 1971

[21] Appl. No.: 154,391

[30] Foreign Application Priority Data
June 19, 1970 Great Britain................... 29,928/70

[52] U.S. Cl................ 324/34 R, 340/259, 324/34 H
[51] Int. Cl............................................. G01r 33/12
[58] Field of Search...................... 324/34 R, 34 TK, 324/34 H, 34 PE, 37; 335/305; 33/141, 174 L; 340;259/; 73/159

[56] References Cited
UNITED STATES PATENTS

| | | | |
|---|---|---|---|
| 2,676,298 | 4/1954 | Frommer | 324/34 R |
| 2,769,105 | 10/1956 | Altschwager | 335/305 |
| 3,178,638 | 4/1965 | Cilyo | 324/34 R |
| 2,511,233 | 6/1950 | Anderson | 324/37 |

FOREIGN PATENTS OR APPLICATIONS 1,076,168  7/1967  Great Britain................... 324/34 H Primary Examiner—Robert J. Corcoran
Attorney—Bacon & Thomas

[57] ABSTRACT

A apparatus for of testing a magnetic characteristic of a metal strip in which the strip is passed under tension over part of the external surface of a hollow cylindrical member, and a magnetic characteristic of the strip is monitored by means of magnetic monitoring device located within said hollow member at a predetermined fixed position relative to the said external surface of the hollow member.

6 Claims, 3 Drawing Figures

PATENTED JUL 24 1973  3,748,575

SHEET 1 OF 2

INVENTOR
MAURICE N. LAPPER
BY
*Bacon & Thomas*
ATTORNEYS

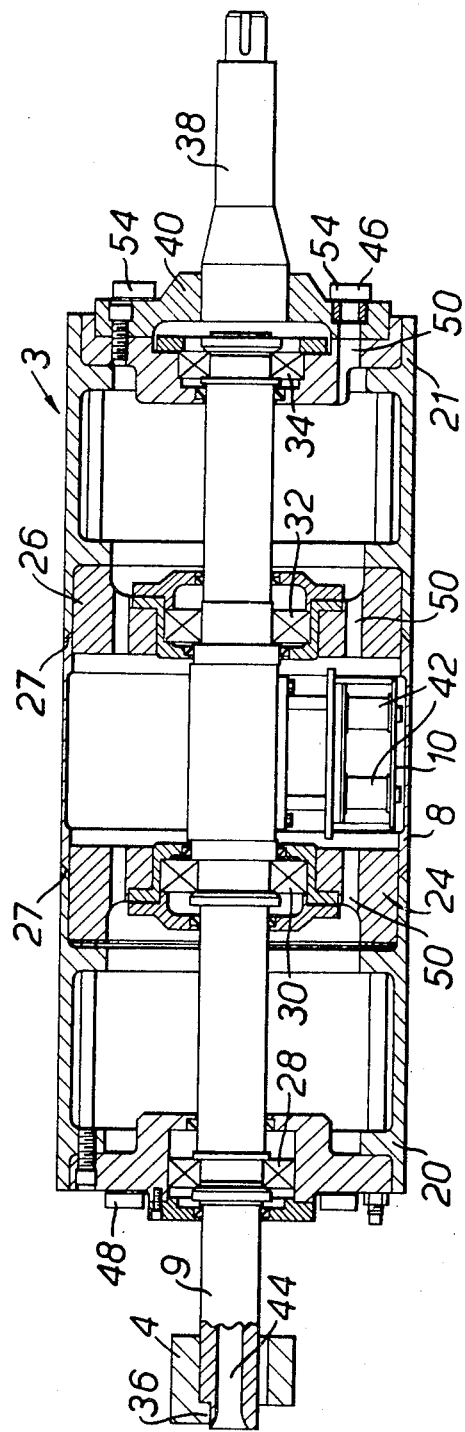

APPARATUS FOR TESTING MAGNETIC CHARACTERISTICS OF A MOVING METAL STRIP UTILIZING A ROLLER CONTAINING A FIXED NONROTATABLE MONITOR IN CONTACT WITH THE STRIP

This invention relates to apparatus for the magnetic testing of metal strip.

More particularly, but not exclusively, the invention is applicable to the magnetic testing of continuous steel strip during processing thereof. The term "magnetic testing" is understood for the purposes of the present specification as meaning any means of testing in which a magnetic parameter associated with a magnetic characteristic of the metal under test is measured or sensed, either directly or as an indication of some other property of the strip. For example, magnetic testing of steel strip may be used to give an indication of the steel chemistry, grain size, hardness, degree of anneal, or the presence of faults or occlusions.

A known method of magnetically testing the hardness of a moving steel strip is to record a magnetic signal or "mark" on the strip by means of a suitable magnetic recording head (ensuring the strip material is saturated) and subsequently to monitor the signal so recorded at a monitoring head spaced downstream from the recording head with respect to the direction of movement of the strip. The strength of the monitored signal picked up from the strip at the monitoring head will be related to the hardness of the strip, since the magnetic properties of the strip material are a function of its hardness. The magnitude of the monitored signal will therefore provide an indication of the hardness of the strip, and by this technique a continuous monitor of strip hardness can be effected.

In the known procedure for carrying out this method of testing, the magnetic recording and monitoring heads are suspended above the strip, which is moving continuously, usually at high speed. It is not uncommon for wave-like irregularities or ripples, travelling at high speed, to form in the advancing strip. In the past, to avoid damage to the magnetic heads by collision with such irregularities it has been necessary to suspend the heads on movable supports which are arranged to be moved automatically out of the path of such irregularities under control of suitable detecting means located upstream of the magnetic heads. With such an arrangement it is not practicable to maintain an accurate gap between the magnetic heads and the strip. Also, slight deformations in the strip, whilst too small to cause retraction of the heads, may introduce errors into the measurement.

An object of the present invention is to provide an improved method and apparatus for testing a moving metal strip, with particular but not exclusive reference to the magnetic testing of steel strip, which avoids the risk of damage to the testing apparatus as a result of wave-like irregularities in the advancing strip.

According to the invention there is provided a method of testing a magnetic characteristic of a metal strip in which the strip is passed under tension over part of the external surface of a hollow cylindrical member, and a magnetic characteristic of the strip is monitored by means of magnetic monitoring device located within said hollow member at a predetermined fixed position relative to the said external surface of the hollow member.

Since the magnetic monitoring device is located within the hollow member, any irregularities which form in the advancing strip upstream of the hollow member do not affect the monitoring device, which is in a fixed position and which can, therefore, operate continuously. The tension in the strip assists in removing irregularities such as ripples.

Preferably the hollow member comprises a hollow cylindrical roll which is mounted for rotation about its axis, the monitoring device being non-rotatably supported within the roll.

The roll may be either an idler roll which is rotated by the passage of the strip over it, or it may be a driven roll.

With particular reference to the application of the testing method to the testing of hardness, the magnetic characteristic of the strip may be monitored by recording a magnetic signal on the strip under test by means of a first magnetic head forming part of the monitoring device, and sensing the signal recorded as the strip passes a second magnetic head of the monitoring device, located downstream, with respect to the direction of strip movement, of the first head, and magnetically shielded therefrom.

The present invention also provides an apparatus for testing a magnetic characteristic of a metal strip, comprising a hollow member having an external cylindrical surface over part of which a strip to be tested is passed in use of the apparatus, and a monitoring device located within the hollow member at a predetermined fixed position relative to the said external surface, said monitoring device being adapted to monitor a magnetic parameter associated with the said magnetic characteristic as the strip passes over the said external surface.

Preferably the hollow cylindrical member comprises a roll supported for rotation about its axis, the monitoring device being non-rotatably mounted within the said roll, and the said roll having a cylindrical wall which is at least partly of non-magnetic material in the region of the monitoring device. The monitoring device may comprise a magnetic recording head adapted to record a magnetic signal on strip passing over the hollow member, a magnetic sensing head adapted to sense the signal so recorded, and positioned downstream, with respect to the direction of strip movement, of the recording head, and a magnetic shield within the hollow member interposed between the said two heads.

In a preferred embodiment of the invention the two magnetic heads are maintained at a fixed angular separation within the hollow member and are mounted on a common fixed shaft upon which the hollow member is supported.

There may be cooling means for cooling the hollow member.

The cooling means may comprise louvres arranged such that, in operation of the apparatus, rotation of the roll generates a current of air through the interior thereof.

There may be a magnet to remove ferromagnetic dust from the cooling air before it reaches the vicinity of the monitoring device.

Figure 2:
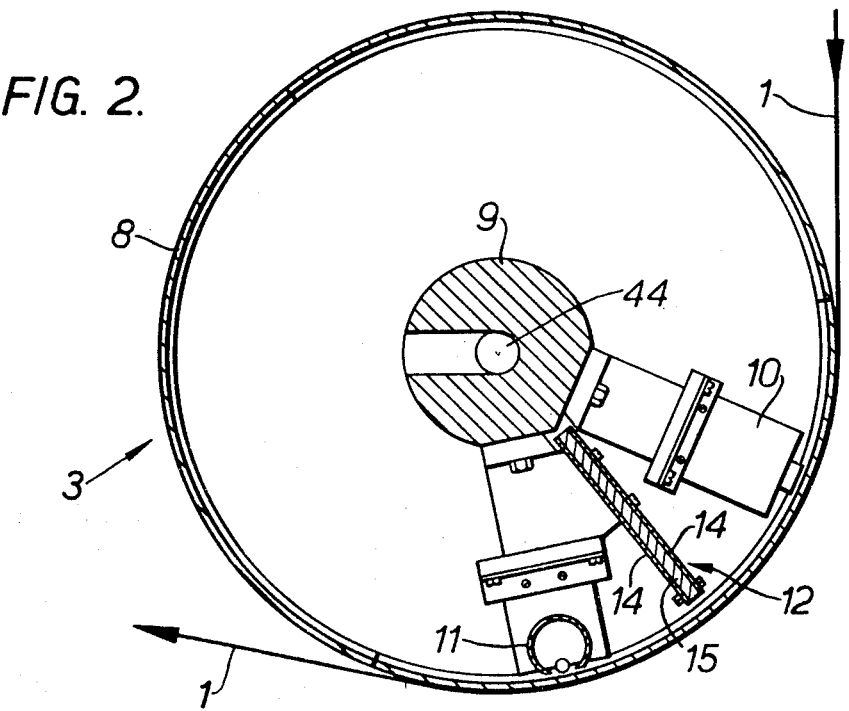

An embodiment of the invention will now be described, merely by way of example, with reference to the accompanying drawings, in which:

FIG. 1 is a diagrammatic elevational view of part of a steel strip mill, incorporating testing apparatus according to the invention, FIG. 2 is a diagrammatic cross sectional view on an enlarged scale of the testing apparatus according to the invention, forming part of FIG. 1, and FIG. 3 is more detailed axial cross-section of the apparatus.

Referring to the drawings, FIG. 1 shows part of a hot strip mill, in particular, part of a continuous annealing section for steel strip.

Steel strip 1 is advanced in a continuous length from a continuous annealing section of a strip mill through an air blast cooling unit 2, part only of which is shown in FIG. 1, through which the strip 1 travels vertically downwardly.

The strip 1 passes around a cylindrical roll 3 which is mounted upon a pedestal 4 for rotation about its axis. The roll 3 forms part of magnetic hardness testing apparatus as hereinafter described.

After passing over part of the surface of the roll 3 the strip 1 passes over a deflector roll 5, which maintains tension in the strip 1, and thence passes around a pair of driving rolls 6, 7 to a subsequent stage of treatment or to a coiler (not shown).

FIG. 2 shows a cross section of the roll 3 in a central region thereof. The roll 3 has a cylindrical outer wall, the central portion 8 of which is formed of non-magnetic, insulating material.

A central fixed shaft 9 which is supported by the pedestal 4 at its opposite ends, supports the roll 3 for rotation about its axis through the intermediary of suitable bearings, typically four in number (not shown).

A monitoring device is mounted within the central region of the shaft 9. The monitoring device comprises a pair of magnetic heads 10, 11 attached to the shaft 9, the heads 10, 11 being spaced apart angularly by a fixed predetermined angle, and each head 10, 11 being spaced by a short predetermined fixed distance (e.g., 0.300 inches) from the outer surface of the central cylindrical wall portion 8 of the roll 3. Where the total angle subtended at the axis of the roll by the region of contact of the strip 1 therewith is greater than 90°, in the illustrated example 103°, the angle between the two heads 10, 11 is typically 55°.

The head 10, which is located upstream with respect to the direction of travel of the strip 1 (indicated by arrows in FIGS. 1 and 2) is a magnetic recording head while the other, downstream, head 11 is a reading head.

The recording head 10 has a U-shaped core with a magnetising coil 42 (FIG. 3) on each arm. The coils 42 are mounted in a diametral plane of the roller 3 at 6 inches centres. The laminations of the core are "Radiometal" (trade mark). In a typical installation, the coil excitation is 25VD.C., 0.25 amps. The flux generated should be sufficient to saturate the heaviest steel strip likely to be processed.

The reading head 11 is of the Smith's fluxgate type, and the AC excitation conveniently may be at 1KHZ frequency.

The wiring for the heads 10, 11 passes out of the roll 3 via an axial bore 44 in the shaft 9.

A magnetic screen 12 is interposed between the two heads 10, 11 within the roll 3 to prevent magnetic interaction between the heads 10 and 11. The screen 12 comprises a pair of metal-plates 14 with an asbestos layer 15 sandwiched therebetween. The asbestos reduces heat-coupling between the heads.

Referring to figure 3, the roll 3 is shown in more detail. The roll consists of two brass outer sections 20 and 21, chrome-plated on their outer surfaces for improved wear resistance, the central section 8 being of "Ferrobestos" (trade mark) material. This material is a hard-wearing insulator and is substantially transparent to magnetic flux.

The central section 8 is mounted on hubs 24, 26 of laminated wood. The material known as "Permali" (trade mark) is suitable. The hubs 24, 26 also support the brass outer sections 20, 21 which have bevelled ends 27 to locate the central section 8 which is in three pieces.

The roll is mounted via bearings 28, 30, 32, 34 for rotation upon the fixed shaft 9, which is of brass. The shaft has a flat 36 to ensure that it is fitted to the pedestal 4 with the heads 10, 11 (fixed to the shaft 9) in the correct angular positions.

Depending on a particular installation, the roll 3 may either idle or be driven; a drive shaft 38 is connected via a flange 40 to the outer section 21 to permit this.

In order to compensate for temperature effects (e.g., due to the heat generated by the coils 42, or if the strip 1 is hot) a flow of cooling air is passed through the roll 3.

The cooling air flow is generated by a number of inlet louvres 46 on one end face of the roll 3, and by a number of exhaust louvres 48 on the other end face. The inlet louvres scoop air into the roll 3 when it is rotated and the exhaust louvres have an extractor effect. Holes 50 (only one shown) in the ends of the roller and holes 52 in the hubs 24, 26 permit the cooling air flow to pass through the roll 3, over the monitoring head 11.

Permanent magnets 54 are provided at the inlet louvres to remove ferromagnetic dust from the cooling air, which otherwise would collect around the recording and monitoring heads.

Further temperature compensation is provided by a silicon thermistor ("silistor") in series with the output winding of the monitoring head fluxgate.

In use of the apparatus to carry out the method of testing according to the invention, the magnetic recording head 10 is energised to record on the steel strip 1 a signal or magnetic "mark," which is subsequently sensed by the reading head 11. The strength of the recorded signal as sensed by the reading head 11 is a function of the magnetic retention of the steel strip 1, which in turn is a function of the hardness of the strip.

In the event of a ripple or other wavelike disturbance occurring in the strip 1 as it advances through the air blast unit 2, no damage will be inflicted on the testing apparatus. Moreover, the heads 10, 11 being carried in fixed positions on the shaft 9, are maintained at predetermined fixed spacings from the strip 1 being monitored, with a degree of accuracy which is obtainable only with difficulty where the heads are mounted on movable supports as has been the practice hitherto.

It will be appreciated that the method and apparatus of the invention are dependent upon the magnetic recording head and the magnetic sensing head being separated from the strip under test by a space which is non-ferromagnetic. For example, the roll over which the strip is passed under tension and within which the recording and sensing heads are disposed may be wholly of non-ferromagnetic material such as brass where the roll is of metal or may be of an electrically insulating material.

In the case of where wear characteristics require the roll to be at least in part of steel, the non-ferromagnetic space may be provided only adjacent the recording and the sensing heads. For example the roll may comprise a cylinder having two steel end portions separated by a non-ferromagnetic center portion adjacent the recording and sensing heads. In the case where the center portion is circumferentially continuous, continuous measurement of magnetic characteristics may be obtained; however, the center portion may be in the form of a cylinder extending over only a portion of the roll circumference in which case regular but intermitent readings of magnetic characteristics will be obtained.

I claim:

1. Apparatus for testing a magnetic characteristic of a metal strip, comprising a roller having an external surface around part of which a strip to be tested is passed during operation of the apparatus, means mounting the roller for rotation about its axis; and a monitoring device non-rotatably mounted within the roller for, monitoring a magnetic parameter associated with the said magnetic characteristic as the strip passes around the said external surface, said monitoring device comprising a magnetic recording means to record a magnetic signal on strip passing around the roller and a magnetic sensing means to sense the signal so recorded, the sensing means being positioned downstream of the recording means, with respect to the direction of strip movement, and a magnetic shield within the roller between the said two means.

2. Apparatus according to claim 1, in which the roller has a cylindrical wall which is at least partly of non-magnetic material, the monitoring device being positioned to monitor the said magnetic parameter through the non-magnetic material.

3. Apparatus according to claim 1, in which the recording means and the sensing means are two magnetic heads maintained at a fixed angular separation within the roller and mounted on a common fixed shaft upon which the roller is supported.

4. Apparatus as claimed in claim 1 comprising cooling means for cooling the interior of the roller.

5. Apparatus as claimed in claim 4 wherein the cooling means comprises louvres arranged such that, in operation of the apparatus, rotation of the roller generates a current of air through the interior thereof.

6. Apparatus as claimed in claim 5, comprising a magnet positioned within the roller to remove ferromagnetic dust from the cooling air before it reaches the vicinity of the monitoring device.

* * * * *